US012608820B2

(12) United States Patent
He et al.

(10) Patent No.: US 12,608,820 B2
(45) Date of Patent: Apr. 21, 2026

(54) METHOD FOR VIDEO MOVING OBJECT DETECTION BASED ON RELATIVE STATISTICAL CHARACTERISTICS OF IMAGE PIXELS

(71) Applicant: ZHEJIANG UNIVERSITY, Hangzhou (CN)

(72) Inventors: Zaixing He, Hangzhou (CN); Xinyue Zhao, Hangzhou (CN); Guangli Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 448 days.

(21) Appl. No.: 18/019,090

(22) PCT Filed: Nov. 13, 2020

(86) PCT No.: PCT/CN2020/128624
§ 371 (c)(1),
(2) Date: Jan. 31, 2023

(87) PCT Pub. No.: WO2022/099598
PCT Pub. Date: May 19, 2022

(65) Prior Publication Data
US 2023/0289979 A1 Sep. 14, 2023

(51) Int. Cl.
*G06T 7/246* (2017.01)
*G06V 10/762* (2022.01)
*G06V 10/764* (2022.01)

(52) U.S. Cl.
CPC ............ *G06T 7/246* (2017.01); *G06V 10/762* (2022.01); *G06V 10/764* (2022.01); *G06T 2207/10016* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 7,627,171 | B2 * | 12/2009 | Hampshire | ............. G06T 7/215 |
| | | | | 382/173 |
| 11,741,683 | B2 * | 8/2023 | Nogami | ................ G06F 18/214 |
| | | | | 382/159 |
| 2023/0266473 | A1 * | 8/2023 | Loot | ..................... G01S 17/931 |
| | | | | 356/21 |

FOREIGN PATENT DOCUMENTS

| | | |
|---|---|---|
| CN | 101330606 | 12/2008 |
| CN | 103578119 | 2/2014 |
| CN | 104715480 | 6/2015 |

* cited by examiner

*Primary Examiner* — Vikkram Bali
(74) *Attorney, Agent, or Firm* — Jiwen Chen; Joywin IP Law PLLC

(57) ABSTRACT

The invention discloses a method for video moving object detection based on the statistical characteristics of image pixels. It can better adapt to changes in environmental lighting, and meanwhile have a better tolerance for dynamic backgrounds in the environment. The present invention first classifies pixels according to the different brightness change trends shown by the reflective characteristics of objects in the image, and then establishes reference points in each category according to the characteristics of each pixel point, and finally for dynamic background points in complex situations etc., based on the characteristics of its brightness value switching back and forth between different objects, using the idea of the Gaussian mixture model to analyze the change category to which the points belong. The invention does not need to update the model in real time, with rapid detection, and good adaptability to complex scenes.

5 Claims, 4 Drawing Sheets

A

B

Number of frames

A

Number of frames

B

Background modeling process

Detection process

METHOD FOR VIDEO MOVING OBJECT DETECTION BASED ON RELATIVE STATISTICAL CHARACTERISTICS OF IMAGE PIXELS

This is a U.S. national stage application of PCT Application No. PCT/CN2020/128624 under 35 U.S.C. 371, filed Nov. 13, 2020 in Chinese, all of which is hereby incorporated by reference.

TECHNICAL FIELD

The present invention relates to the technical field of computer vision and industrial automation, in particular to a method for video moving object detection based on relative statistical characteristics of image pixels.

BACKGROUND TECHNOLOGY

The detection of dynamic objects in video is an important issue currently studied. Its goal is to extract dynamic objects that pass through the scene in the video. It has important applications in many fields, such as intelligent monitoring, identification and tracking of intelligent robots, etc. Although there have been many studies in this field, there are still many factors that interfere with the accuracy of target detection. For example, in outdoor scenes, the illumination changes with the changes of the weather, the shaking of the camera, the constantly shaking branches and leaves in the background, and the constantly spraying fountain, etc., will all affect the detection of real moving objects.

At present, there are two main methods for moving object detection: One method is the establishment of a model based on the time change of pixel gray value, such as the widely used Gaussian mixture model, which is based on the brightness information of each pixel in the training set. Several Gaussian models that are more in line with most of the training frames are obtained, and whether the current frame is in line with the trained Gaussian model to determine whether it is the foreground point. However, methods based on this need to update the background model in real time. In scenes such as outdoor lighting changes and intermittently moving backgrounds, there are often more false detections due to the model update process. The second method is a background modeling method based on spatial reference, such as the Visual Extraction Background method (ViBe). In the ViBe model, the background model stores a sample set for each background point, and then compares each new pixel value to the sample set to determine whether it belongs to the background point. If a new observation value belongs to the background point, then it should be closer to the sampled value in the sample set. The advantage of this initialization method is that it is more sensitive to noise, the amount of calculation is small and the speed is fast, and the detection of moving objects can be carried out quickly. The disadvantage is that it is easy to introduce the Ghost area.

In view of the shortcomings of the current methods, we propose to use statistical learning methods to classify similar points, and use the concept of class to analyze and judge the foreground points. For each pixel, select a reference point in its class, when the object passes, the relationship between the pixel point and the reference point will be destroyed, so that the foreground point can be detected, and the detection speed can be improved while ensuring the accuracy.

SUMMARY OF THE INVENTION

In order to solve the shortcomings of existing moving object detection algorithms, the present invention proposes a method for video moving object detection based on the relative statistical characteristics of image pixels.

The technical scheme of the present invention comprises the following steps:

Before the method is implemented, the training video is converted into a video image sequence and named uniformly.

Step 1, pixel classification stage: In the training set with the number of images denoted as T, extracting the gray value of each pixel to form a vector as the basic information of each pixel value and perform clustering processing, and the points in the picture are divided into several categories based on the lighting characteristics, each category generates a cluster center as a representative in this category; the expression of pixels in the pixel space is $$S=\{I_1,I_2,I_3,I_4 \ldots I_T\}$$

$$S=\{(u,v,t)|0 \leqslant u \leqslant W, 0 \leqslant v \leqslant H, 0 \leqslant t \leqslant T\};$$

wherein, $I_1$, $I_2$, $I_3$, $I_4$ . . . $I_T$ are the image frame sequence, (u, v, t) are the pixel points in the pixel space, W, H, T are respectively the frame width, frame height, and number of frame of the image frame sequence.

Step 2, processing complex pixels stage: Calculating the Euclidean distance for each pixel to its cluster center, and extracting the points that are more different from the cluster center as complex points for further processing, and then re-processing the remaining pixels for classification, the formula for expressing the Euclidean distance of the pixel is $$d = \frac{1}{T}\sqrt{\sum_{i=1}^{T}(p_i - q_i)^2}$$

Step 3, reference point selection stage: For each target point, the method of image spatial clustering is adopted, and reference points are selected scattered in each category; for complex points, according to their changing trends, finding the two categories that best represent it, and the reference points are selected in the two categories respectively;

Step 4, detection stage: Processing and comparing the target pixel to be detected with its reference point, setting a threshold to determine whether it is the foreground point, and the determination method is $$\omega_k = \begin{cases} 1 & \text{if} |P - Q_k^B - c_k| \geq \eta \cdot \sigma_k \\ 0 & \text{else} \end{cases}$$

$$F = \sum_{k=1}^{n}\omega_k$$

$$\text{Result} = \begin{cases} \text{foreground} & \text{if} \quad F > th \\ \text{background} & \text{else} \end{cases}$$

wherein, P is the brightness value of the target pixel in the detection image, $Q_k^B$ is the brightness value of the k-th background point, and $c_k$ is the statistical average difference between the brightness of the point P and the k-th background point in the training set, th is the threshold.

The present invention integrates background modeling methods such as image segmentation (step 1+2), mixed Gaussian model (step 3), etc., for moving object detection.

In the step 1, the method of clustering the pixel point vector is specifically: using the difference in the reflective characteristics of different materials in the image, that is, the vector composed of the trend of the gray value of each pixel point changing with time for classification; Before classification, the pixels are first de-averaged, and the median filtering method is used for preprocessing to eliminate the error information caused by the foreground objects in the training data set images. When determining the number of K-means classifications, use the elbow method to estimate the best classification number K in advance.

Step 2 determining the criteria for distinguishing complex points and the processing method specifically described as follows: After calculating the Euclidean distance between all the pixels in the image and their respective cluster centers, sorting them from small to large, and taking the Euclidean distance as the ordinate, and the sort value as the abscissa, calculating the first derivative, finding the corresponding abscissa at the first maximum point as the dividing point for separating the complex points, and the point whose distance from the cluster center is greater than the corresponding value at this point is taken as complex points for processing, the complex points are treated as a single category, and the remaining points are clustered again, and the final number of clusters is K+1.

The specific method for selecting the reference point in step 3 is:

3.1 Taking the coordinates of the respective pixels in each category in the image as input, and clustering them into n categories. Each category generates a cluster center, that is, the most central point in the sub-category;

3.2 For complex points, selecting the cluster centers of each category for matching, using the method of Gaussian mixture model to find out the two most consistent categories, and using the two categories as the basis for selecting reference points for complex points;

3.3 For general static pixels, in n blocks of each category, the point with the highest correlation coefficient is selected as the reference point, and the number of reference points for each pixel is n;

3.4 Finding the average value of the difference in gray value between each pixel and its reference point in each frame of the training data set and record it, and recording the coordinates of the corresponding reference point.

The specific implementation method of step 3.2 is: Adding 10, 20, 30 . . . 250 to all the elements of the gray vector of the cluster center in turn, and comparing them with the pixel gray value vector respectively. For the gray value of the same frame, that is the value of the same subscript in the vector, if the difference is within the threshold T, then this point and its coordinates are recorded as a valid point. In the same way, performing the same operation on each cluster center. A total of 25×K sets of records are obtained. The 25K sets of data are arranged and combined to find two groups that satisfy the maximum number of effective points. The cluster centers corresponding to these two sets are the two categories to be found to represent dynamic background points. Recording the two effective points and the number of frames corresponding to each set.

The object of comparison in step 4 is whether the difference between the gray values of the pixel to be detected and its corresponding reference point meets the requirements. The specific processing method is as follows: for general static background points, the gray value of each pixel point in the training set and its reference point are directly calculated and averaged to obtain the inherent gray value difference. For complex dynamic background points, because it uses the two classes are collectively represented, each class corresponds to a specific number of frames in the training set, that is, the number of effective frames. The difference of the reference points of each class in the sequence of the corresponding effective frames is calculated to obtain its own inherent gray difference.

The model and parameters are set and stored in the training stage, without the need to update the background model and parameters in real time. In the detection stage, the input video is converted to image mode and adjusted to the specified size. Respectively modulate the coordinate of the reference point of each pixel, the difference between the gray value of the reference point and the target point. For complex dynamic background points, respectively modulate the reference point coordinates of the decomposition class, the effective frame number subscript of the corresponding reference point of each class, and the difference between the gray value at the effective reference frame number and that at the target point.

For each pixel point, if it is a general point, that is, a static background point, obtain the difference after subtracting its gray value from the gray value of the pixel of the reference point, and subtracting the inherent gray value, if it is within the required threshold, it is determined that this pixel is a point in the background of the image, and there is no foreground object passing here, otherwise, it is determined to be a foreground point. For complex points, that is, dynamic background points, the same determination operation is performed on the two types of reference points to which they belong. Setting the threshold ng, if after each reference point is used for determination, the number of times that it is determined as the previous scenic spot exceeds the threshold ng, then this pixel is finally output as a foreground pixel.

The present invention proposes a new method for moving object detection, which can directly obtain results based on input training data sets and to-be-detected videos and can also be combined with other detection methods to further improve the accuracy of detection.

The beneficial effects of the present invention are:

1) The present invention proposes to divide the image into several different categories according to the different changes in the gray value over time caused by the different reflective characteristics of the background objects/materials in the image, and on this basis, analyze and process each pixel at the pixel level, which improves the visualization and accuracy of image processing.

2) The present invention effectively solves the problem of the common scene illumination changing with time in the intelligent monitoring scene through the cross-referencing method between similar objects/materials, and there is no need to update the background model in real time during the detection process, which greatly improves the speed of detection.

The same kind of objects/materials have the same reflective characteristics and the same brightness change trend, which ensures the rationality of the spatial reference method in the moving object detection problem.

3) The present invention innovatively proposes a processing idea for complex target pixels. In moving object detection problems, camera shake, dynamic background, stagnation/removal of foreground objects, etc. are common problems. This method can effectively extract such complex points for separate processing after clustering and analyzing the image. At the same time, using the concept of the category of the object in the image, the complex pixels caused by the above problems are decomposed into hidden categories, and the existing categories in the image are combined to express, and a new idea of dealing with complex points is proposed. No special processing is required for normal pixels, so the speed of detection is greatly improved.

DESCRIPTION OF THE EMBODIMENTS

The present invention will be further described below in conjunction with the drawings and embodiments.

Figure 1:
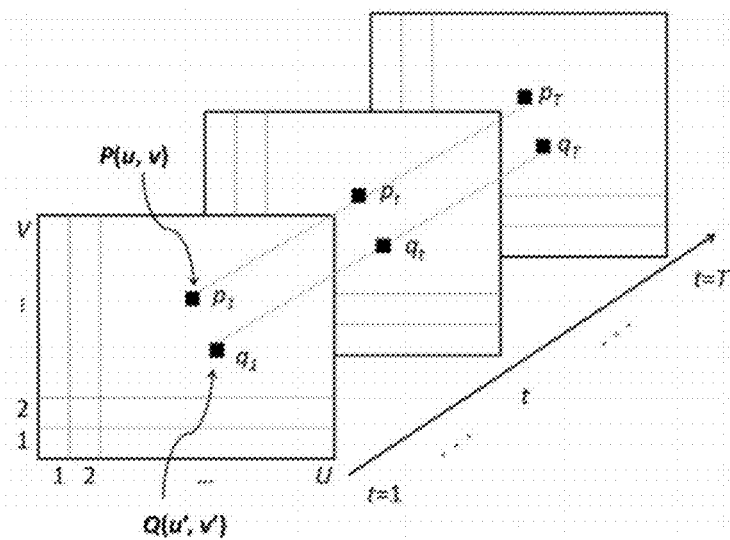
FIG. 1 is a schematic diagram of the pixel vector composition process of the method of the present invention.

FIG. 1 shows a schematic diagram of the composition process of the gray vector of each pixel. As shown in the figure, the number of images in the training set is T, which represents the number of frames of the training video is T, and the number of pixels contained in each picture is U×V, which represents the size of the image. For each pixel (x, y) ($1 \leqslant x \leqslant U, 1 \leqslant y \leqslant V$) in the image, arranging their brightness in each frame, which can be expressed as a vector [$I_1$, $I_2$, $I_3$ . . . $I_t$], as the basic parameter of each pixel. So we represent the brightness values of all points in the training set as a 3 dimensional matrix, represented by the symbol $\Gamma$, $\Gamma$ (x, y, t)=I, where $1 \leqslant x \leqslant w, 1 \leqslant y \leqslant v, 1 \leqslant t \leqslant T$.

As shown in the figure, the pixel point P at the target point (x, y) in the image can be expressed as a vector P(x,y)=[$I_1$, $I_2$, $I_3$ . . . $I_T$]. Similarly, the brightness value of the pixel Q at any point (x', y') in the video can be expressed as a vector Q(x', y')=[$I_1$, $I_2$, $I_3$ . . . $I_T$].

The first step is the pixel classification stage: in the training set with the number of images T, the gray value of each pixel is extracted according to the above method to compose a vector as the basic information of each pixel value. Since some time when the foreground points pass by, the training data set will be interfered with the establishment of the model, and the gray values of the frames when the foreground points passed by are significantly different from most other frames, these interferences should be eliminated by median filtering in advance. After denoising, the averaging process is performed. The de-averaging operation ensures that the vector for clustering reflects the changing trend of pixels instead of the absolute gray value. The purpose of clustering the points with the same changing trend into one category instead of directly clustering is to reduce the number of clusters K, thereby speeding up the operation of the algorithm. K-means clustering processing is performed after de-averaging and de-noising processing.

K-means clustering needs to enter the number of categories K in advance. The method used in this algorithm is the "elbow method" to determine K, that is, the images are classified according to the number of categories from K=3 to K=20, and after each classification, extract the sum of the distances between all pixels and their cluster centers, and draw the image, the abscissa is K, the ordinate is the sum of distances S, when perform K-means clustering, an image will have an ideal value $K_0$, when $K<K_0$, the sum of the distances of all pixels to their cluster centers in the image will increase drastically, when $K>K_0$, the sum of the distances of all pixels to their cluster centers in the image will decrease drastically, so the graph line will show a more obvious inflection point near the optimal value $K_0$, where the corresponding K value is used as the optimal classification number K.

Figure 2:
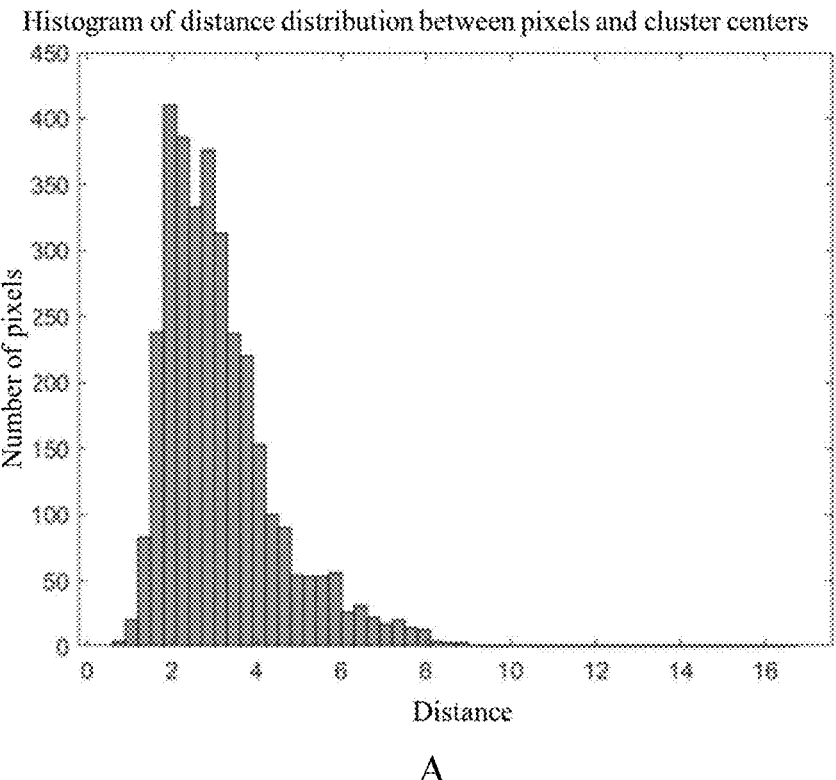
FIG. 2 shows the statistical characteristics of the static background point and the dynamic background point and the cluster center respectively in the method of the present invention.
Figure 2:
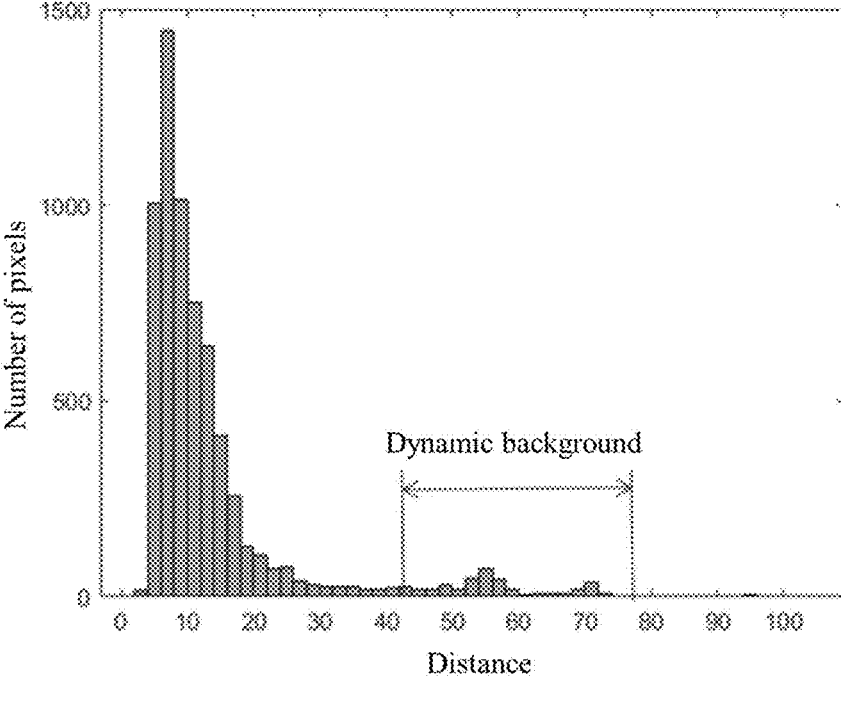

The second step is to process complex pixels: in the image, static background points have better data properties, and they have a higher correlation coefficient with the cluster center to which they belong, so they are closer to the cluster center. However, some complex points are mainly dynamic background points, such as swaying leaves and gushing fountains, which constantly switch between different background objects. Therefore, the statistical information of pixels does not satisfy any category, and its own statistical characteristics are difficult to determine. FIG. 2A and FIG. 2B show the statistical characteristics of static background points and dynamic background points and their cluster centers. Due to the limited number of clusters, dynamic background points are often classified into relatively close categories, but their statistical characteristics are very different from the cluster center point, so they are far away from the cluster center. Because of this feature, the distance curve will have a clear gap between the general point and the complex point, and the boundary will change drastically. After deriving the number-distance curve, there will be an obvious maximum value. At the maximum point, finding the corresponding abscissa as a dividing point for separating the complex points, and treating the points whose distance from the cluster center is greater than the corresponding value at this point as complex points. The complex points are treated as a single category, and the remaining points are clustered again, and the final number of clusters is K+1.

The third step is the reference point selection stage: for each target point, the method of image spatial clustering is adopted, and the coordinates of the respective pixels in each category in the image are used as input, and the clustering is made into n categories. Each category generates a cluster center, that is, the most central point in the sub-category. In n blocks of each category, the point with the highest correlation coefficient is selected as the reference point, and the number of reference points for each pixel is n. Finding the average value of the difference in gray value between each pixel and its reference point in each frame of the training data set and record it and recording the coordinates of the corresponding reference point.

For a complex point, finding the two classes that best represent it according to its changing trend, and selecting the reference points in the two classes respectively. The specific implementation method is as follows: adding 10, 20, 30 . . . 250 to all the elements of the gray vector of the cluster center in turn, and comparing them with the pixel gray value vector respectively. For the gray value of the same frame, that is the value of the same subscript in the vector, if the difference is within the threshold T, then this point and its coordinates are recorded as a valid point. In the same way, performing the same operation on each cluster center. A total of 25×K sets of records are obtained. The 25K sets of data are arranged and combined to find two groups that satisfy the maximum number of effective points. The cluster centers corresponding to these two sets are the two categories to be found to represent dynamic background points. Recording the two effective points and the number of frames corresponding to each set.

Figure 3:
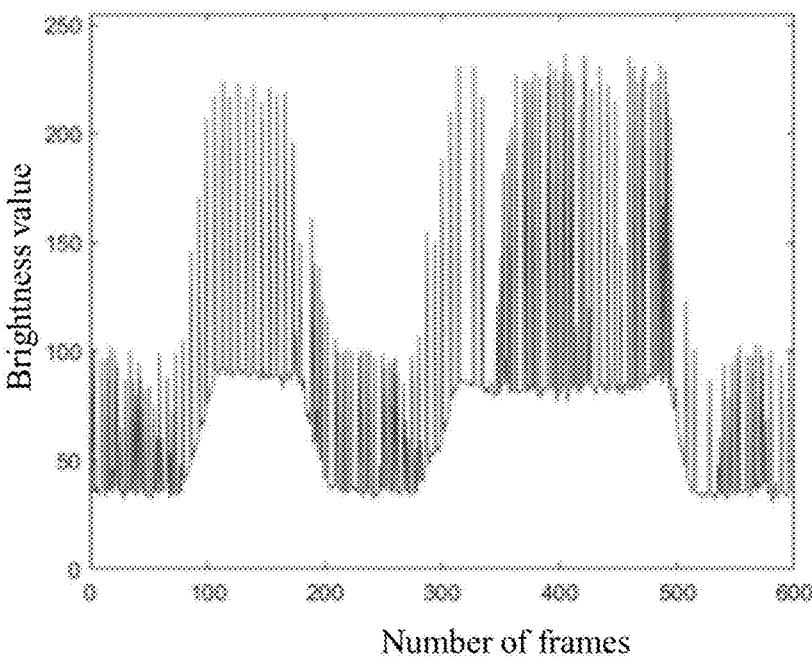
FIG. 3 is a schematic diagram of the solution process of the static category to which the dynamic background point belongs in the method of the present invention.
Figure 3:
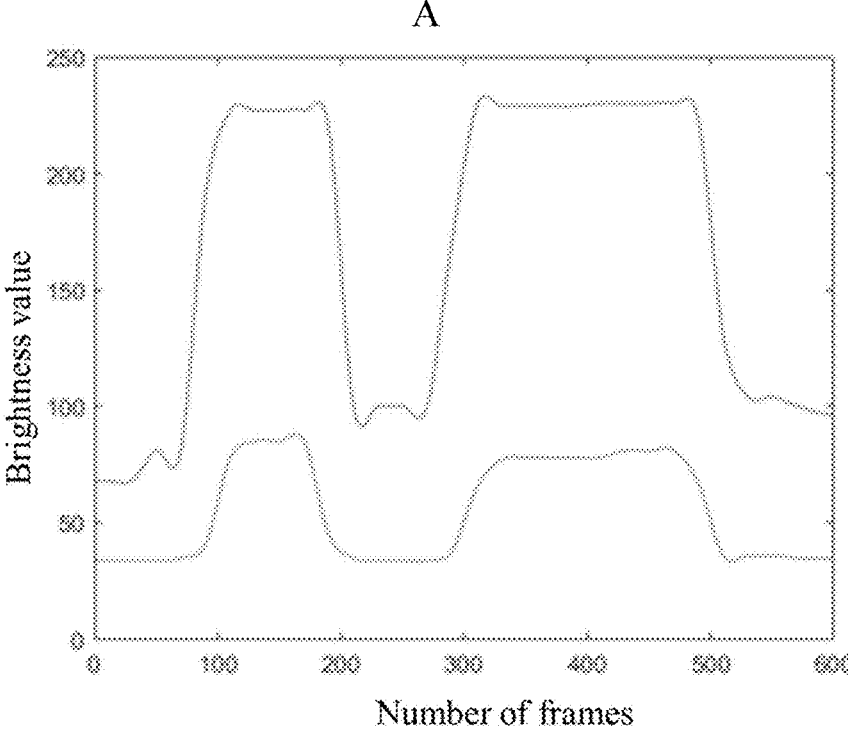

FIG. 3 shows the solution process of the static category of the dynamic background point: FIG. 3A is the curve of the brightness value of a dynamic background point in the image over time, and FIG. 3B is the category of the dynamic background solved by the above method.

For general static background points, the gray value of each pixel point in the training set and its reference point are directly calculated and averaged to obtain the inherent gray value difference. For complex dynamic background points, because it uses the two classes are collectively represented, each class corresponds to a specific number of frames in the training set, that is, the number of effective frames. The difference of the reference points of each class in the sequence of the corresponding effective frames is calculated to obtain its own inherent gray difference.

The fourth step is the detection stage: before the video sequence frame detection, the model and parameters are set in the training stage and have been stored, and there is no need to update the background model and parameters in real time. Converting the input video into a video image sequence and adjusting it to the specified size. Respectively modulating the coordinate of the reference point of each pixel, the difference between the gray value of the reference point and the target point. For complex dynamic background points, respectively modulating the reference point coordinates of the decomposition class, the effective frame number subscript of the corresponding reference point of each class, and the difference between the gray value at the effective reference frame number and that at the target point.

Figure 4:
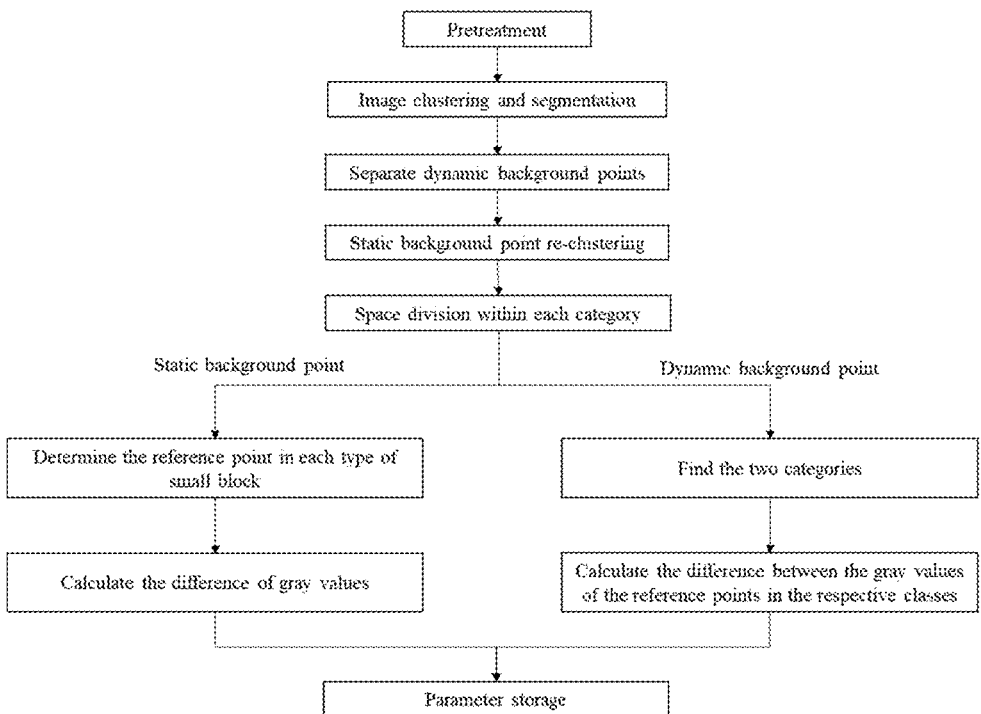
FIG. 4 is a general flow chart of the method of the present invention.
Figure 4:
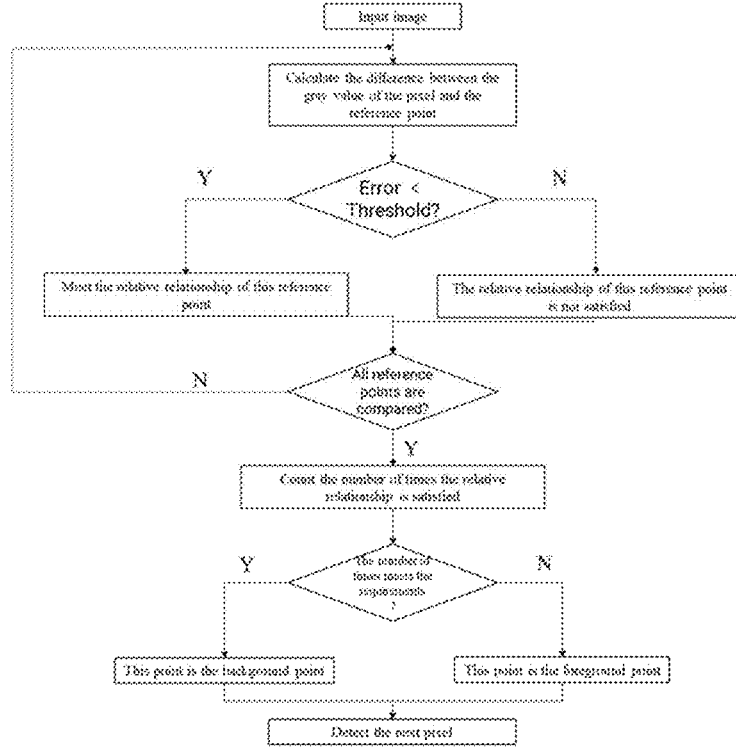

For each pixel point, if it is a general point, that is, a static background point, obtain the difference after subtracting its gray value from the gray value of the pixel of the reference point, and subtracting the inherent gray value, if it is within the required threshold, it is determined that this pixel is a point in the background of the image, and there is no foreground object passing here, otherwise it is determined to be a foreground point. For complex points, that is, dynamic background points, the same determination operation is performed on the two types of reference points to which they belong. Setting the threshold nq, if after each reference point is used for determination, the number of times that it is determined as the previous scenic spot exceeds the threshold ng, then this pixel is finally output as a foreground pixel. The overall flow chart of the modeling and testing process is shown in FIG. 4.

The above are only specific embodiments of the present invention, but the technical features of the present invention are not limited thereto. Any simple changes, equivalent substitutions or modifications made on the basis of the present invention in order to solve basically the same technical problems and achieve basically the same technical effects are all covered by the protection scope of the present invention.

The invention claimed is:

1. A method for video dynamic object detection based on relative statistical characteristics of image pixels, characterized in that:

step 1: pixel classification stage: in the training set with a plurality of images denoted as T, extracting a gray value of each pixel to form a vector as basic information of each pixel value and performing clustering processing, and dividing pixels in the images into several categories based on brightness characteristics, each category generating a cluster center as a representative in the category; an expression of pixels in a pixel space being $$S=\{I_1,I_2,I_3,I_4 \ldots I_T\}$$

$$S=\{(u,v,t)|0 \leq u \leq W, 0 \leq v \leq H, 0 \leq t \leq T\};$$

wherein, $I_1$, $I_2$, $I_3$, $I_4$ . . . $I_T$ are an image frame sequence, (u, v, t) are pixel points in the pixel space, W, H, T are respectively a frame width, a frame height, and a number of frame of the image frame sequence;

step 2: processing complex pixels stage: calculating a Euclidean distance for each pixel to its cluster center, and extracting the pixel points that are more different from the cluster center as complex points for further processing, and then re-processing the remaining pixels for classification, a formula for expressing the Euclidean distance of the pixel being $$d = \frac{1}{T}\sqrt{\sum_{i=1}^{T}(p_i - q_i)^2}$$

wherein, $p_i$ is a brightness value of a target pixel at the i-th frame, $q_i$ is a brightness value of a cluster center point at the i-th frame;

step 3: reference point selection stage: for each target point, adopting a method of image spatial clustering, and selecting the reference points scattered in each category; for the complex points, according to their changing trends, finding two categories that best represent it, and selecting the reference points in the two categories respectively;

step 4: detection stage: processing and comparing the target pixel to be detected with its reference point, setting a threshold to determine whether it is a foreground point;

wherein: an object of comparison in the step 4 is whether a difference between gray values of the pixel to be detected and its corresponding reference point meets requirements; a specific processing method is as follows: for general static background points, a gray value of each pixel point in a training set and its reference point are directly calculated and averaged to obtain an inherent gray value difference; for complex dynamic background points, because it uses two classes are collectively represented, each class corresponds to a specific number of frames in the training set, that is, a number of effective frames; difference of reference points of each class in a sequence of corresponding effective frames is calculated to obtain its own inherent gray difference;

wherein the model and parameters are set and stored in a training stage, without a need to update a background model and parameters in real time; in the detection stage, an input video is converted to image mode and adjusted to a specified size; respectively modulating a coordinate of a reference point of each pixel, a difference between a gray value of a reference point and a target point; for complex dynamic background points, respectively modulating the reference point coordinates of a decomposition class, an effective frame number subscript of a corresponding reference point of each class, and a difference between a gray value at an effective reference frame number and that at the target point;

for each pixel point, if it is a general point, that is, a static background point, obtain a difference after subtracting its gray value from a gray value of the pixel of a reference point, and subtracting an inherent gray value, if it is within an adequate threshold, it is determined that this pixel is a point in a background of the image, and there is no foreground object passing here, otherwise it is determined to be a foreground point; for complex points, that is, dynamic background points, same determination operation is performed on two types of reference points to which they belong; setting a threshold $n_q$, if after each reference point is used for determination, a number of times that it is determined as a previous scenic spot exceeds the threshold $n_q$, then this pixel is finally output as a foreground pixel.

2. A method according to claim 1, characterized in that: in the step 1, the method of clustering a pixel point vector specifically comprises: using difference in reflective characteristics of different materials in the image, that is, the pixel point vector composed of a trend of a gray value of each pixel point changing with time for classification; before classification, first de-averaging the pixels, and using the median filtering method for preprocessing to eliminate error information caused by foreground objects in the training data set images; when determining a number of K-means classifications, using an elbow method to estimate best classification number K in advance.

3. A method according to claim 1, characterized in that: the step 2 determining a criteria for distinguishing complex points and the processing method comprises: after calculating a Euclidean distance between all the pixels in the image and their respective cluster centers, sorting them from small to large, and taking the Euclidean distance as an ordinate, and a sort value as an abscissa, calculating a first derivative, finding a corresponding abscissa at a first maximum point as a dividing point for separating complex points, and a point whose distance from the cluster center is greater than a corresponding value at this point being taken as complex points for processing, the complex points being treated as a single category, and remaining points being clustered again, and a final number of clusters being K+1.

4. A method according to claim 1, characterized in that: the specific method for selecting the reference point in the step 3 comprises:

step 3.1 taking coordinates of respective pixels in each category in the image as input, and clustering them into n categories, each category generating a cluster center, that is, a most central point in a sub-category;

step 3.2 for the complex points, such as swaying leaves and spraying fountains in the image, since they change back and forth between different classes in the image, selecting the cluster centers of each category for matching, using a method of Gaussian mixture model to find out two most consistent categories, and using two categories as a basis for selecting reference points for the complex points;

step 3.3 for general static pixels, in n blocks of each category, selecting points having a highest correlation coefficient with the as the reference point, and a number of reference points for each pixel being n;

step 3.4 finding an average value of a difference in gray value between each pixel and its reference point in each frame of the training data set and record it, and recording coordinates of a corresponding reference point.

5. A method according to claim 4, characterized in that: a specific implementation method of the step 3.2 comprises: adding 10, 20, 30 . . . 250 to all elements of a gray vector of the cluster center in turn, and comparing them with a pixel gray value vector respectively; for a gray value of a same frame, that is a value of a same subscript in a vector, if difference is within a threshold T, then this point and its coordinates are recorded as a valid point; in a same way, performing a same operation on each cluster center; a total of 25×K sets of records are obtained; the 25K sets of data being arranged and combined to find two groups that satisfy a maximum number of effective points; the cluster centers corresponding to these two sets being two categories to be found to represent dynamic background points; recording two effective points and a number of frames corresponding to each set.

* * * * *